(12) United States Patent
Schultz

(10) Patent No.: US 8,555,720 B2
(45) Date of Patent: Oct. 15, 2013

(54) MEMS DEVICE WITH ENHANCED RESISTANCE TO STICTION

(75) Inventor: Peter S. Schultz, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 287 days.

(21) Appl. No.: 13/033,854

(22) Filed: Feb. 24, 2011

(65) Prior Publication Data

US 2012/0216616 A1    Aug. 30, 2012

(51) Int. Cl.
*G01P 15/125* (2006.01)

(52) U.S. Cl.
USPC ..................................... 73/514.32; 73/514.38

(58) Field of Classification Search
USPC ............... 73/514.32, 514.38, 514.36, 514.16, 73/504.14, 510
See application file for complete search history.

(56) References Cited

U.S. PATENT DOCUMENTS

| | | | |
|---|---|---|---|
| 6,029,517 A * | 2/2000 | Brun et al. ................. | 73/514.38 |
| 6,955,086 B2 * | 10/2005 | Yoshikawa et al. ......... | 73/514.32 |
| 7,418,864 B2 * | 9/2008 | Asami et al. ................ | 73/514.32 |
| 7,554,711 B2 | 6/2009 | Miles | |
| 2006/0277997 A1 * | 12/2006 | Foster et al. ................ | 73/514.32 |
| 2010/0128337 A1 | 5/2010 | Tung | |
| 2011/0154899 A1 * | 6/2011 | Classen et al. ............. | 73/514.32 |
| 2012/0125104 A1 * | 5/2012 | Qiu et al. ................... | 73/514.32 |
| 2012/0167681 A1 * | 7/2012 | Reinmuth ................... | 73/504.12 |
| 2012/0280591 A1 * | 11/2012 | Schultz ........................ | 310/300 |

* cited by examiner

*Primary Examiner* — Helen Kwok
(74) *Attorney, Agent, or Firm* — Schmeiser, Olsen & Watts LLP; Lowell W. Gresham; Charlene R. Jacobsen

(57) ABSTRACT

A MEMS device (20) includes a substrate (24) and a movable element (22) adapted for motion relative to the substrate (24). A secondary structure (46) extends from the movable element (22). The secondary structure (46) includes a secondary mass (54) and a spring (56) interconnected between the movable element (22) and the mass (54). The spring (56) is sufficiently stiff to prevent movement of the mass (54) when the movable element (22) is subjected to force within a sensing range of the device (20). When the device (20) is subjected to mechanical shock (66), the spring (56) deflects so that the mass (54) moves counter to the motion of the movable element (22). Movement of the mass (54) causes the movable element (22) to vibrate to mitigate stiction between the movable element (22) and other structures of the device (20) and/or to prevent breakage of components within the device (22).

18 Claims, 4 Drawing Sheets

MEMS DEVICE WITH ENHANCED RESISTANCE TO STICTION

TECHNICAL FIELD OF THE INVENTION

The present invention relates generally to microelectromechanical systems (MEMS) devices. More specifically, the present invention relates to a MEMS device with enhanced resistance to stiction and damage from mechanical shock.

BACKGROUND OF THE INVENTION

Microelectromechanical Systems (MEMS) devices are widely used in applications such as automotive, inertial guidance systems, household appliances, protection systems for a variety of devices, and many other industrial, scientific, and engineering systems. Such MEMS devices are used to sense a physical condition such as acceleration, pressure, or temperature, and to provide an electrical signal representative of the sensed physical condition.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

Figure 1:
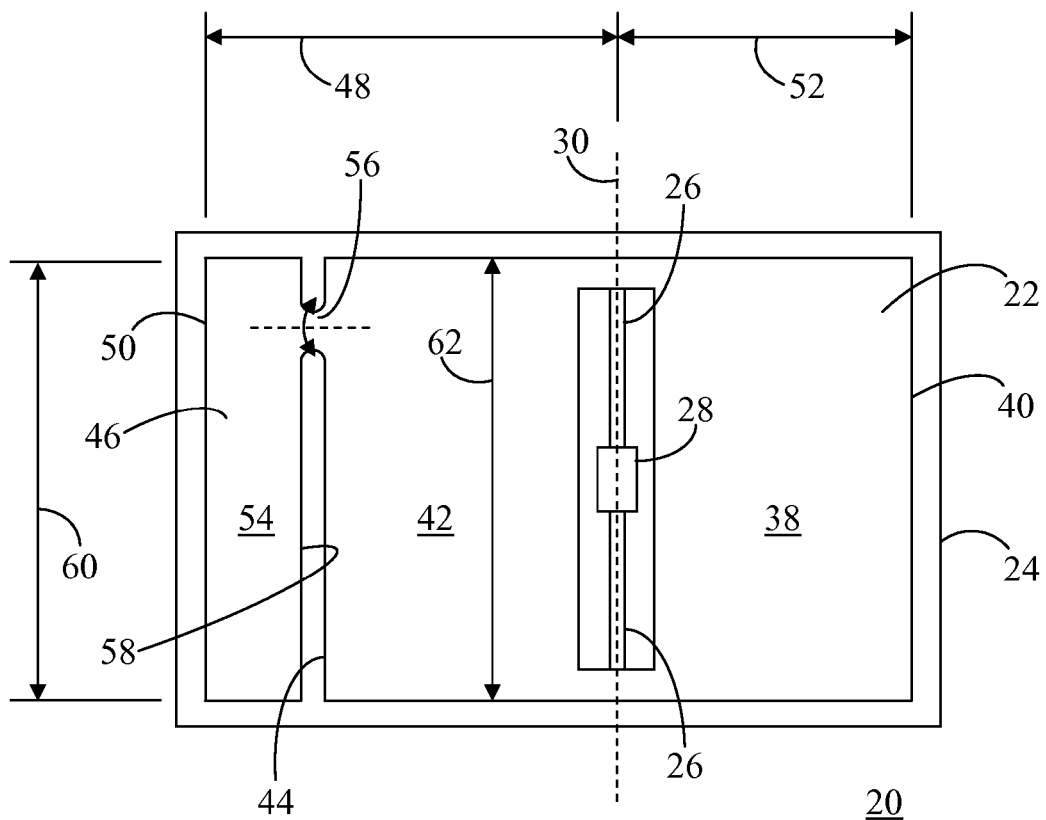
FIG. 1 shows a top view of a MEMS device in accordance with an embodiment.

Suspended movable microstructures such as plates and beams are commonly used in the manufacturing of various microelectromechanical systems (MEMS) MEMS devices. These suspended movable microstructures can be adversely affected during normal use by excessive external forces, such as mechanical shock. A mechanical or physical shock is a sudden acceleration or deceleration caused, for example, by impact, drop, kick, and so forth. This mechanical shock can cause severe reliability problems in the structure of a MEMS device.

The suspended microstructures of MEMS devices typically have relatively large surface areas with high stiffness. However, the suspension springs for such suspended microstructures may have relatively low stiffness depending upon the application. For example, some accelerometers are designed to include highly compliant (i.e. low stiffness) suspension springs so that the suspended microstructures will move a detectable amount under conditions of 1 g magnitude or less. In addition, the microstructures are fabricated a few microns off their supporting substrate. The combination of these characteristics makes MEMS devices susceptible to surface forces which can deflect the suspended movable microstructures vertically toward the supporting substrate and/or laterally toward surrounding structures or lateral stops. If the deflection force is sufficiently strong, the movable member can come into contact with and temporarily or permanently adhere to the underlying substrate or the lateral structures causing false output signals and/or device failure. This unintentional adhesion of a movable structure is referred to as stiction. Stiction can occur both during MEMS device fabrication and during normal use.

During normal use, stiction can occur if the suspended movable microstructure is placed in temporary or permanent contact with its substrate by external forces, such as mechanical shock. In addition to, or alternatively, mechanical shock can cause breakage or fracture of various elements within the MEMS device permanently degrading long-term reliability of the MEMS device.

Embodiments of the invention entail microelectromechanical (MEMS) devices with enhanced resistance to stiction and damage when subjected to mechanical shock. In particular, embodiments entail a secondary structure extending from a suspended movable element. The secondary structure includes a spring element adapted for movement counter to the motion of the movable element when the MEMS device is subjected to mechanical shock. The term "secondary structure" used herein refers to a projecting member supported only at one end, i.e., a secondary. In addition, the term "counter to" used herein refers to movement that is in opposition to or at variance with the motion of the movable element. This movement causes the secondary structure to vibrate or resonate so that the movable element is less likely to adhere to the underlying substrate. Alternatively, should stiction occur at least momentarily, the vibratory movement of the secondary structure could result in separation of the movable microstructure from the substrate. Furthermore, some of the energy from the mechanical shock may be absorbed by the spring element in order to limit or prevent breakage to internal structures of the MEMS device. Thus, a MEMS device that includes the secondary structure may be less likely to fail when subjected to mechanical shock, thereby enhancing long term device reliability.

Figure 2:
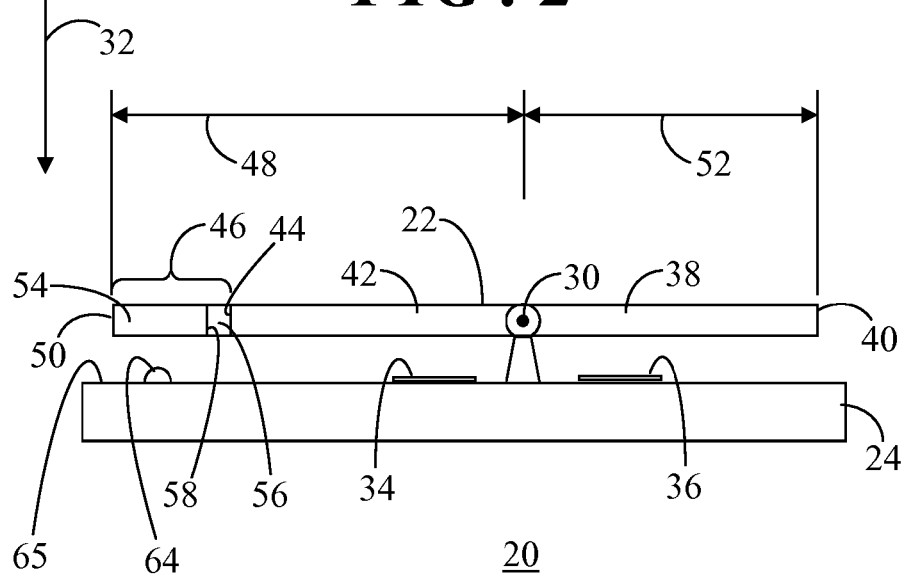
FIG. 2 shows a side view of the MEMS device of FIG. 1.

Referring to FIGS. 1 and 2, FIG. 1 shows a top view of a MEMS device 20 in accordance with an embodiment, and FIG. 2 shows a side view of MEMS device 20. In this example, MEMS device 20 is a two layer capacitive transducer having a "teeter-totter" or "see saw" configuration. MEMS device 20 includes a movable element or plate, referred to as a proof mass 22, suspended above a substrate 24. In an embodiment, proof mass 22 may be flexibly suspended above substrate 24 by one or more spring members, for example, rotational flexures 26 situated at elevated attachment points via an anchor 28 coupled to the underlying substrate 24. Rotational flexures 26 enable rotation of proof mass 22 about a rotational axis 30 under z-axis acceleration, represented by an arrow 32. The accelerometer structure of MEMS device 20 can measure two distinct capacitances between proof mass 22 and two sense plates 34 and 36 that are symmetrically located relative to rotational axis 30 in order to determine differential or relative capacitance. Although the embodiments discussed herein pertain to accelerometer structures, it should be understood that the following discussion applies equivalently to other MEMS devices having movable parts that could be damaged when subject to a mechanical shock.

Proof mass 22 includes a first section 38 between rotational axis 30 and a first end 40 of proof mass 22, and a second section 42 between rotational axis 30 and a second end 44 of proof mass 22. In accordance with an embodiment, a secondary structure 46 extends from second end 44 of proof mass 22 and is suspended above substrate 24. A combined length 48 of second section 42 and secondary structure 46 from rotational axis 30 to an outer side edge 50 of secondary structure 46 is greater than a section length 52 of first section 38 from rotational axis 30 to first end 40 of proof mass 22. Thus, rotation can occur about rotational axis 30 in response to z-axis acceleration 32 because the combined weight of second section 42 and secondary structure 46 is heavier than first section 38.

Secondary structure 46 includes a secondary mass 54 and a spring element, in the form of a torsion spring 56. Torsion spring 56 is interconnected between second end 44 of proof mass 22 and an inner side edge 58 of secondary mass 54. Thus, secondary structure 46 is a projecting member that is supported only at one end, i.e., the interconnection of torsion spring 56 with proof mass 22. In an embodiment, secondary mass 54 is has a generally rectangular shape, with outer and inner side edges 50 and 58, respectively, oriented approximately parallel to second end 44 of proof mass 22. Additionally, a length 60 of outer and inner side edges 50 and 58 is approximately equivalent to a width 62 of proof mass 22 in a direction parallel to rotational axis 30. Thus, the combined shape of second section 42 and secondary mass 54 resembles the "heavy end" of a "teeter-totter" or "see saw" proof mass configuration.

In the illustrated embodiment, at least one bump 64 extends from a top surface 65 of substrate 24. Bump 64 is positioned in a gap between substrate 24 and secondary mass 54. Thus, bump 64 underlies secondary mass 54, and is configured to minimize the contact area between secondary mass 54 and the underlying substrate 24 when proof mass 22 is subjected to mechanical shock.

The spring element, i.e., torsion spring 56, interconnected between inner side edge 50 and second end 44 of proof mass 22, is positioned at a location offset from a center of length 60 of inner side edge 50. As will be discussed in greater detail below, torsion spring 56 is characterized by a spring stiffness that is greater than a collective spring stiffness of the spring members, i.e., rotational flexures 26. In an exemplary embodiment, the spring stiffness of torsion spring 56 may be at least one order of magnitude (i.e., about ten times) greater than a collective spring stiffness of rotational flexures 26. The stiffness of a spring is generally a measure of its resistance to deformation. Thus, a stiffer spring requires greater force to deform it than a spring that is more compliant, i.e., less stiff. It should be understood that the spring stiffness needed for torsion spring 56 is additionally related to the mass (i.e., weight) of secondary mass 54 relative to the mass (i.e., weight of proof mass 22). In other words, the spring stiffness needed for torsion spring 56 is related to how much mass (i.e. weight) torsion spring 56 is supporting.

In an embodiment, the collective spring stiffness of rotational flexures 26 enables flexures 26 to twist in response to z-axis acceleration 32 within a particular sensing range, for example, between 0 and 8 g's, so that proof mass 22 rotates about rotational axis 30 at accelerations within the sensing range. However, due to its greater stiffness, torsion spring 56 is prevented from deflecting appreciably, i.e., rotating, within the particular sensing range of MEMS device 20. Instead, torsion spring 56 must be subjected to a significantly greater force, e.g., mechanical shock, at levels of hundreds or thousands of g's before it will deflect appreciably.

Figure 3:
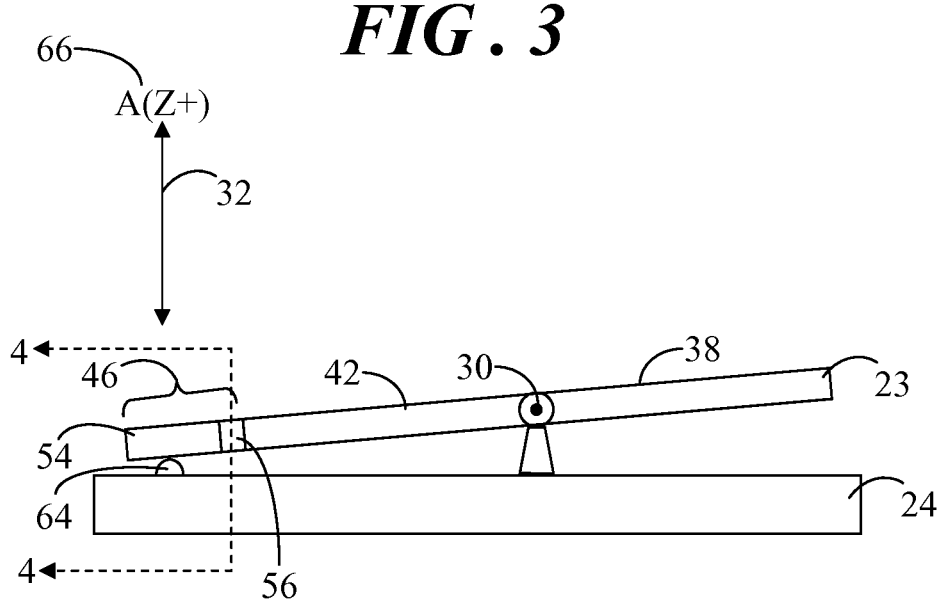
FIG. 3 shows a side view of the MEMS device of FIG. 1 subjected to mechanical shock.
Figure 4:
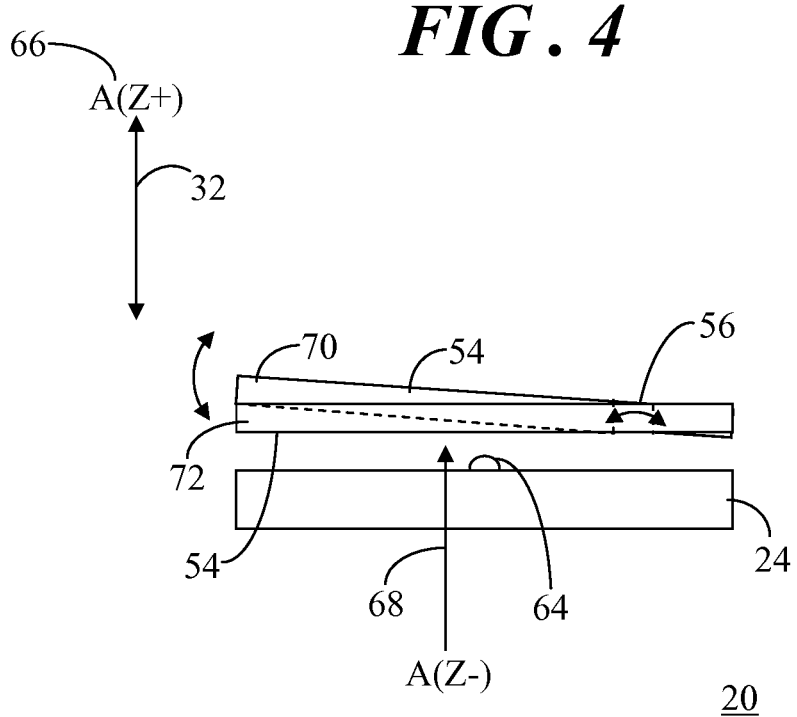
FIG. 4 shows a partial edge view of the MEMS device along section lines 4-4 of FIG. 3.

Referring to FIGS. 3 and 4, FIG. 3 shows a side view of the MEMS device 20 subjected to a mechanical shock 66, represented by A(Z+), and FIG. 4 shows a partial edge view of the MEMS device 20 along section lines 4-4 of FIG. 3. In this illustrative embodiment, mechanical shock 66, A(Z+), is a z-axis acceleration 32 that is greater than the sensing range of MEMS device 20. When subjected to mechanical shock 66, proof mass 22 will rotate about rotational axis 30 such that secondary mass 54 strikes bump 64. This strike imposes a force 68, represented by A(Z−), on secondary mass 54 that is generally counter to mechanical shock 66. In response, torsion spring 56 deflects, or rotates, so that the "heavy end" of secondary mass 54 (i.e., the end of secondary mass 54 that is opposite to the location of torsion spring 56) moves counter to the motion of proof mass 22 imparted on it by mechanical shock 66. In other words, secondary mass 54 will deflect out of plane with the planar surface of proof mass 22, as best seen in FIG. 4 by two distinct instantaneous positions 70 and 72 of secondary mass 54. Contact of secondary mass 54 with bump 64 may serve to amplify the deflection of secondary mass 54 relative to proof mass 22 by increasing the rotation of torsion spring 56 so as to provide greater restoring force or vibration.

Deflection at torsion spring 56 causes secondary mass 54 to vibrate or resonant, so that the entire proof mass 22 also vibrates or resonates. Thus, proof mass 22 is less likely to stick with the underlying substrate 24 in response to mechanical shock 66. Furthermore, should stiction occur such that proof mass 22 sticks to the underlying substrate 24, at least momentarily, the vibration of secondary mass 54 is likely to cause proof mass 22 to quickly become unstuck from substrate 24. Accordingly, secondary structure 46 that includes secondary mass 54 and torsion spring 56 does not change or affect the normal operation of MEMS device 20 under low z-axis acceleration 32. However, should MEMS device 20 sustain high z-axis acceleration, e.g., mechanical shock 66, the vibration of proof mass 22 imparted on it by deflection of torsion spring 56 will make sustained stiction less likely.

Figure 5:
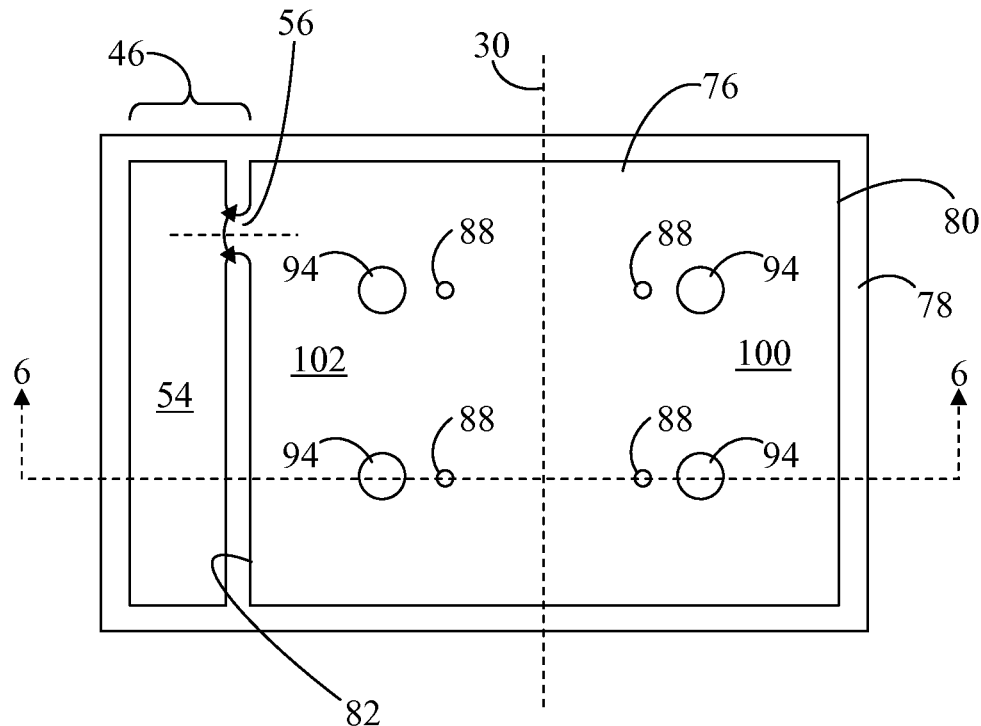
FIG. 5 shows a top view of a MEMS device in accordance with another embodiment.
Figure 6:
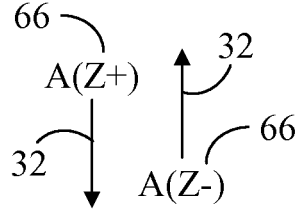
FIG. 6 shows a side view of the MEMS device along section lines 6-6 of FIG. 5.
Figure 6:
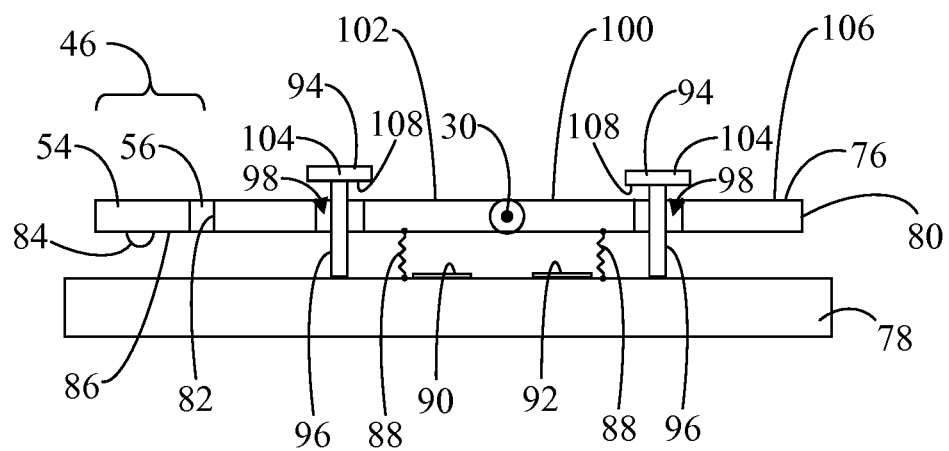

Referring now to FIGS. 5 and 6, FIG. 5 shows a top view of a MEMS device 74 in accordance with another embodiment, and FIG. 6 shows a side view of MEMS device 74. Like MEMS device 20 (FIG. 1), MEMS device 74 is a two layer capacitive transducer having a "teeter-totter" or "see saw" configuration. That is, MEMS device 74 includes a movable element or plate, referred to as a proof mass 76 suspended above a substrate 78. Proof mass 76 includes a first end 80 and a second end 82, and secondary structure 46 extends from second end 82 of proof mass 76. As shown, a bump 84 extends from a bottom surface 86 of secondary mass 54 and is positioned in a gap between substrate 78 and secondary structure 46.

In the illustrated embodiment, proof mass 76 is flexibly suspended above substrate 78 by four spring members 88 interconnected between proof mass 76 and substrate 78 for enabling motion of proof mass 76 relative to substrate 78. That is, spring members 88 are spaced to form a virtual rotational axis 30 between pairs of spring members 88. Spring members 88 enable rotation of proof mass 76 about rotational axis 30 under z-axis acceleration 32. Like MEMS device 20 (FIG. 1), the accelerometer structure of MEMS device 74 enables measurement of two distinct capacitances between proof mass 76 and two sense plates 90 and 92 formed on substrate 78 and approximately symmetrically located relative to rotational axis 30 in order to determine differential or relative capacitance.

MEMS device 74 may include a number of vertical stops 94. In general, each vertical stop 94 includes a post unit 96 coupled to substrate 78 and passing through an aperture 98 in proof mass 76. In the illustrated embodiment, MEMS device 74 includes a pair of vertical stops 94 having post units 96 directed through a first section 100 of proof mass 76 between rotational axis 30 and first end 80. MEMS device 74 further includes another pair of vertical stops 94 having post units 96 directed through a second section 102 of proof mass 76 between rotational axis 30 and second end 82. Each vertical stop 94 includes a cap 104 having a greater diameter than the diameter of aperture 98. In operational use, as proof mass 76 rotates about rotational axis 30, a top surface 106 of proof mass 76 may contact a bottom surface 108 of one or more caps 104. Thus, vertical stops 94 limit movement of proof mass 76 under somewhat greater than normal z-axis acceleration 32 so that proof mass 76 is less likely to become damaged.

When a MEMS device that does not include secondary structure 46 is subjected to, for example, mechanical shock 66, one or more caps 104 of vertical stops 94 may break or shear off. For example, when mechanical shock 66 is a negative Z mechanical shock 66, A(Z−), first section 100 of proof mass 76 will rotate toward substrate 78 and second section 102 of proof mass 76 will rotate away from substrate 78. Consequently, caps 104 of those vertical stops 94 extending through second section 102 may be broken. Conversely, when mechanical shock 66 is in the opposite direction, i.e., a positive Z mechanical shock 66, A(Z+), second section 102 of proof mass 76 will rotate toward substrate 78 and first section 100 of proof mass 76 will rotate away from substrate 78. Consequently, caps 104 of those vertical stops 94 extending through first section 100 may be broken.

With the inclusion of secondary structure 46 in MEMS device 74, the energy of mechanical shock 66 in either of negative Z and positive Z directions may be absorbed by secondary structure 46 so that vertical stops 94 are less likely to break or shear.

Figure 7:
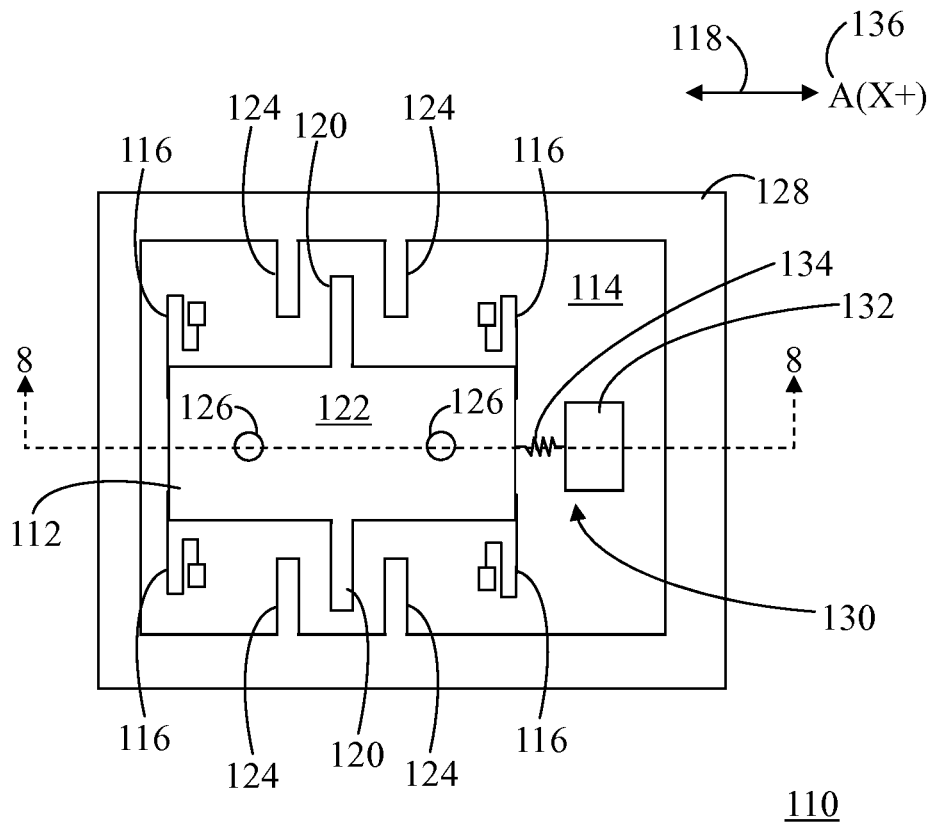
FIG. 7 shows a top view of a MEMS device in accordance with yet another embodiment.
Figure 8:
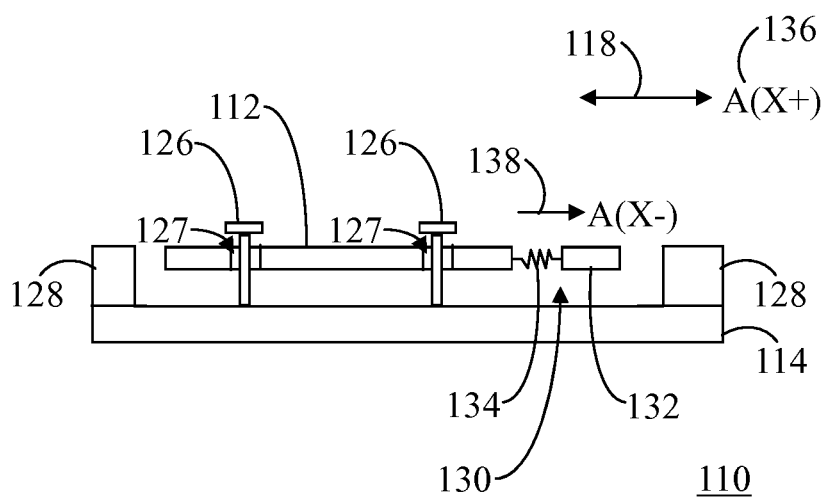
FIG. 8 shows a side view of the MEMS device along section lines 8-8 of FIG. 7.

Referring to FIGS. 7 and 8, FIG. 7 shows a top view of a MEMS device 110 in accordance with yet another embodiment, and FIG. 8 shows a side view of MEMS device 110. Previous discussion was directed to teeter-totter style sensors for detection of a physical condition perpendicular to a plane of the sensor. However, principles of the present invention need not be limited to z-axis sensors. Instead, the present invention can be readily adapted for sensors that detect a physical condition in a direction parallel to a plane of the sensor.

MEMS device 110 includes a movable element, in the form of a proof mass 112, suspended above a substrate 114 by one or more spring members 116. In an embodiment, spring members 116 are interconnected between proof mass 112 and substrate 114, and enable substantially linear motion of proof mass 112 relative to substrate 114. In this example, proof mass 112 with spring members 116 can move substantially parallel to substrate 114 in response to an x-axis acceleration, as represented by an arrow 118.

Proof mass 112 includes movable fingers 120 extending from a body 122 of proof mass 112. Each movable finger 120 is located between a pair of fixed fingers 124 that are fixed, or stationary, relative to substrate 114. The accelerometer structure of MEMS device 110 can measure distinct capacitances between each movable finger 120 and its corresponding pair of fixed fingers. These capacitances are a measure of an external physical condition such as x-axis acceleration 118. Although only two movable fingers 120 and two pairs of fixed fingers 124 are shown, those skilled in the art will readily recognize that MEMS device 110 can include any number of movable fingers 120 and fixed fingers 124 in accordance with particular design criteria.

MEMS device 110 may further include lateral stop structures 126 that extend through apertures 127 in proof mass 112. Lateral stop structures 126 may be similar in design to vertical stops 94 (FIG. 6), discussed above. In addition, or alternatively, MEMS device 110 may include a stop structure embodied as a fixed frame 128 encircling proof mass 112. Stop structures 126 and fixed frame 128 function to limit excessive movement of proof mass 112 in response to x-axis acceleration 118 that is greater than the sensing range for MEMS device 110.

A secondary structure 130 extends from proof mass 112 and is suspended above substrate 114. Secondary structure 130 includes a secondary mass 132 and a spring element 134 interconnected between proof mass 112 and secondary mass 132. Thus, secondary structure 130 is a projecting member that is supported only at one end, i.e., the interconnection of spring element 134 with proof mass 112. In an embodiment, spring element 134 may be a compression spring that exhibits a stiffness that is greater than a combined stiffness of spring members 116.

In an embodiment, the collective spring stiffness of spring members 116 enables spring members 116 to deflect in response to x-axis acceleration 118 within a particular sensing range, for example, between 0 and 8 g's, so that proof mass 112 moves laterally, i.e. parallel to the surface of substrate 114, and movable fingers 120 change position with respect to fixed fingers 124. However, due to its greater stiffness, compression spring 134 is prevented from deflecting appreciably, i.e., compressing, within the particular sensing range of MEMS device 110. Instead, compression spring 134 must be subjected to a significantly greater force, e.g., a mechanical shock 136 represented by A(X+), at levels of hundreds or thousands of g's before it will deflect appreciably.

In this illustrative embodiment, mechanical shock 136, A(X+), is an x-axis acceleration 118 that is greater than the sensing range of MEMS device 110. When subjected to mechanical shock 136, proof mass 112 will move laterally until proof mass 112 strikes fixed frame 128 and/or stop structures 126. This strike imposes a force 138, represented by A(X−), on secondary mass 132 that is generally counter to mechanical shock 136. In response, compression spring 134 deflects (compresses and releases) so that secondary mass 132 moves counter to the motion of proof mass 112 imparted on it by mechanical shock 136.

Deflection at compression spring 134 causes secondary mass 132 to vibrate or resonant, so that the entire proof mass 112 also vibrates or resonates. Thus, proof mass 112 is less likely to stick with the underlying substrate 114 and/or fixed frame 128 in response to mechanical shock 136. Furthermore, should stiction occur such that proof mass 112 sticks to the underlying substrate 114 and/or fixed frame 128, at least momentarily, the vibration of secondary mass 132 is likely to cause proof mass 112 to quickly become unstuck.

Accordingly, secondary structure 130 that includes secondary mass 132 and compression spring 134 does not change or affect the normal operation of MEMS device 110 under low x-axis acceleration 118. However, should MEMS device 110 sustain high x-axis acceleration, e.g., mechanical shock 136, the vibration of proof mass 112 imparted on it by deflection of compression spring 134 will make sustained stiction highly unlikely. Furthermore, with the inclusion of secondary structure 130 in MEMS device 110, the energy of mechanical shock 136 in either of negative X and positive X directions may be turned into energy that vibrates secondary mass 132 so that proof mass 112 is less likely to stick to the underlying substrate 114 and/or to fixed frame 128. In addition, any energy absorbed by compression spring 134 could limit shearing of stop structures 126 or damage to fixed farm 128.

In summary embodiments of the invention entail microelectromechanical (MEMS) devices with enhanced resistance to damage from mechanical shock. In particular, embodiments entail a secondary structure extending from a movable suspended microstructure. The secondary structure includes a spring element adapted for movement counter to, i.e., at variance with, the motion of the movable microstructure when the MEMS device is subjected to mechanical shock. This movement causes the secondary structure to vibrate or resonate so that the movable element is less likely to adhere to the underlying substrate. Alternatively, the vibratory movement of the secondary structure could result in separation of the movable microstructure from the substrate should stiction occur. Furthermore, some of the energy from the mechanical shock may be absorbed by the spring element in order to limit or prevent breakage to internal structures of the MEMS device. Thus, a MEMS device that includes the secondary structure may be less likely to fail when subjected to mechanical shock, thereby enhancing long term device reliability.

Although the preferred embodiments of the invention have been illustrated and described in detail, it will be readily apparent to those skilled in the art that various modifications may be made therein without departing from the spirit of the invention or from the scope of the appended claims. For example, embodiments of the invention may be adapted to provide failure protection from mechanical shock to MEMS devices having two or more sense directions.

What is claimed is:

1. A microelectromechanical systems (MEMS) device comprising:
   a substrate;
   a movable element suspended above said substrate and adapted for motion relative to said substrate about a rotational axis interposed between first and second ends of said movable element, said movable element including a first section between said rotational axis and said first end and a second section between said rotational axis and said second end; and
   a secondary structure extending from said second end of said movable element and suspended above said substrate, said secondary structure including a secondary mass and a spring element, said secondary mass having a side edge oriented approximately parallel to said second end of said movable element, said spring element being interconnected between said second end of said movable element and said side edge of said secondary mass, and said spring element enabling movement of said secondary mass counter to said motion of said movable element.

2. A MEMS device as claimed in claim 1 further comprising at least one spring member interconnected between said movable element and said substrate for enabling said motion of said movable element about said rotational axis, each of said at least one spring member exhibiting a first stiffness that is less than a second stiffness of said spring element.

3. A MEMS device as claimed in claim 2 wherein said second stiffness of said spring element is at least an order of magnitude greater than a collective stiffness of each of said at least one spring member.

4. A MEMS device as claimed in claim 1 wherein a stiffness of said spring element substantially prevents said movement of said secondary mass counter to said movable element when said movable element is subjected to a force within a sensing range of said MEMS device.

5. A MEMS device as claimed in claim 1 wherein a stiffness of said spring element enables said movement of said secondary mass counter to said movable element when said movable element is subjected to a force that is greater than a sensing range of said MEMS device.

6. A MEMS device as claimed in claim 1 wherein said spring element comprises a torsion spring.

7. A MEMS device as claimed in claim 1 wherein said spring element comprises a compression spring.

8. A MEMS device as claimed in claim 1 wherein said first section between said rotational axis and said first end is characterized by a section length, and a combined length of said second section and said secondary structure extending from said second end of said second section is greater than said section length.

9. A MEMS device as claimed in claim 1 wherein a length of said side edge of said secondary mass is approximately equivalent to a width of said movable element in a direction parallel to said rotational axis.

10. A MEMS device as claimed in claim 1 wherein said spring element is interconnected between said second end of said movable element and said side edge of said secondary mass at a location offset from a center of a length of said side edge.

11. A MEMS device as claimed in claim 1 wherein said secondary structure includes a bottom surface, said substrate includes a top surface, and said MEMS device further comprises a bump extending from one of said bottom surface and said top surface and positioned in a gap between said substrate and said secondary structure.

12. A microelectromechanical systems (MEMS) device comprising:
    a substrate;
    a movable element suspended above said substrate and adapted for motion relative to said substrate about a rotational axis interposed between first and second ends of said movable element, said movable element including a first section between said rotational axis and said first end and a second section between said rotational axis and said second end; and
    a secondary structure extending from said second end of said movable element and suspended above said substrate, said secondary structure including a secondary mass and a spring element, said secondary mass having a side edge oriented approximately parallel to said second end of said movable element, said spring element being interconnected between said second end of said movable element and said side edge of said secondary mass, and said spring element exhibits a stiffness, wherein:
    said stiffness of said spring element enables movement of said secondary mass counter to said movable element when said movable element is subjected to a force that is greater than a sensing range of said MEMS device; and
    said stiffness of said spring element substantially prevents said movement of said secondary mass counter to said movable element when said movable element is subjected to a force within said sensing range of said MEMS device.

13. A MEMS device as claimed in claim 12 wherein said spring element comprises a torsion spring.

14. A MEMS device as claimed in claim 13 wherein said spring element is interconnected between said second end of said movable element and said side edge of said secondary mass at a location offset from a center of a length of said side edge.

15. A microelectromechanical systems (MEMS) device comprising:
a substrate;
a movable element suspended above said substrate, said movable element being adapted for motion about a rotational axis interposed between first and second ends of said movable element, said movable element including a first section between said rotational axis and said first end and a second section between said rotational axis and said second end; and
a secondary structure extending from said second end of said movable element and suspended above said substrate, said secondary structure including a secondary mass and a spring element, said secondary mass having a side edge oriented approximately parallel to said second end of said movable element, said spring element being interconnected between said second end of said movable element and said side edge of said secondary mass, said spring element enabling movement of said secondary mass counter to said motion of said movable element when said movable element is subjected to a force that is greater than a sensing range of said MEMS device.

16. A MEMS device as claimed in claim 15 wherein said spring element comprises a torsion spring.

17. A MEMS device as claimed in claim 15 wherein said first section between said rotational axis and said first end is characterized by a section length, and a combined length of said second section and said secondary structure extending from said second end of said second section is greater than said section length.

18. A MEMS device as claimed in claim 15 wherein said secondary mass includes a side edge oriented approximately parallel to said second end of said movable element, and said spring element is interconnected between said second end of said movable element and said side edge of said secondary mass at a location offset from a center of a length of said side edge.

* * * * *